United States Patent [19]

Yonaiyama et al.

[11] Patent Number: 4,613,647
[45] Date of Patent: Sep. 23, 1986

[54] POLYPROPYLENE COMPOSITIONS CONTAINING POLYAMIDES REINFORCED BY GLASS FIBERS

[75] Inventors: Rikio Yonaiyama, Ichiharashi; Michio Kasai, Kisarazushi; Nobukazu Atsumi, Ichiharashi, all of Japan

[73] Assignee: Chisso Corporation, Osaka, Japan

[21] Appl. No.: 715,266

[22] Filed: Mar. 25, 1985

[30] Foreign Application Priority Data

Mar. 28, 1984 [JP] Japan .................................. 59-60379

[51] Int. Cl.[4] ...................... C08L 23/26; C08L 77/10; C08K 3/40; C08K 7/28
[52] U.S. Cl. ..................................... 524/514; 524/494
[58] Field of Search ......................... 524/514

[56] References Cited

U.S. PATENT DOCUMENTS 4,500,668  2/1985  Shimizu et al. ...................... 524/514

FOREIGN PATENT DOCUMENTS

| 0048174 | 12/1974 | Japan | 524/514 |
|---|---|---|---|
| 0044148 | 4/1976 | Japan | 524/514 |
| 0120761 | 10/1978 | Japan | 524/514 |
| 0028241 | 3/1981 | Japan | 524/514 |
| 1345747 | 2/1974 | United Kingdom . | |
| 2052528 | 1/1981 | United Kingdom | 524/514 |

OTHER PUBLICATIONS

Derwent Abs. 83-741285/34 (BE 896431-A) 8-1983 Mitsubishi.
Derwent Abs. 83898X/45 (J51106157) 9-1976, Asahi Dow.
Derwent Abs. 56963A/32 (DT2703416) 8-1978, BASF AG.
Chem. Abs. 98-73418(a), 1983, Kokubu et al. (FR 2504143).

*Primary Examiner*—Herbert J. Lilling
*Attorney, Agent, or Firm*—Fred Philpitt

[57] ABSTRACT

Polypropylene compositions reinforced by glass fibers having superiority in mechanical properties, rigidity and visual appearance are provided by melting and kneading a mixture of (A) polypropylene resin modified by an unsaturated carboxylic acid or an anhydride thereof or a polypropylene resin containing 5 parts by weight or more of polypropylene resin modified by an unsaturated carboxylic acid or an anhydride thereof, (B) a polyamide resin obtained by the polycondensation of metaxylene diamine and adipic acid and (C) glass fibers, each in specified amount.

9 Claims, No Drawings

POLYPROPYLENE COMPOSITIONS CONTAINING POLYAMIDES REINFORCED BY GLASS FIBERS

BACKGROUND OF THE INVENTION

1. Field of Art

This invention relates to polypropylene compositions reinforced by glass fibers. More particularly, it relates to polypropylene compositions reinforced by glass fibers having superiority in mechanical properties, rigidity and visual appearance.

2. Prior Arts

Recently, demand of high rigidity and high mechanical strength for thermoplastic resins used as raw materials for parts of automobile, electric appliances and various kinds of other industrial products is increasing. In compliance with this demand, in case of polypropylene (hereinafter referred to as PP) also, development of polypropylene reinforced by glass fibers (hereinafter referred to as FR-PP) which is obtained by addition of glass fibers to PP is going on actively.

However, as PP is a non-polar resin, wetting (or affinity)of this PP to the glass fibers on the surface of these glass fibers is worse and even when glass fibers are simply added to PP, improvement effectiveness is hardly recognizable in mechanical strength (such as tensile strength, flexural strength or the like).

On this account, PP modified with unsaturated carboxylic acid or anhydride thereof (hereinafter referred to as unsaturated carboxylic acid group) (hereinafter referred to modified PP) is added to PP and as glass fibers, those in which the surfaces are treated with a silane coupling agent having reactivity with unsaturated carboxylic acid group are used, as a method for improving wetting property, i.e. adhesiveness between PP and glass fibers.

On the other hand, with the increase of adhesiveness between the PP and glass fibers, there is a tendency that visual appearance of molded articles becomes worse.

Further, the improvement of rigidity can be attained by increasing the amount of to-be-added glass fibers but there is a problem that the increase of addition of glass fibers makes worse the visual appearance of molded articles. Moreover, if the amount of addition of glass fibers is increased, besides the deteriration of the above-mentioned visual appearance, the increase of specific gravity of molded articles loses the merit of light-weightness and thus there is a limit in the increase of addition amount of glass fibers.

Accordingly, it is desirable to obtain high rigidity, high mechanical strength as well as good visual appearance with a small amount of addition of glass fibers.

On this account, there is known a method in which a polyamide resin, particularly nylon 6 or nylon 66, and glass fibers are added to PP. In this case, in order to improve the compatibility of PP with a polyamide resin the addition of modified PP to PP is carried out. However, in case of compositions consisting of PP, modified PP, a common polyamide resin such as nylon 6, nylon 66 and glass fibers, there is a problem that mechanical strength, and rigidity are exceedingly reduced on account of moisture absorption when they are made into molded articles because nylon 6 and nylon 66 have moisture absorption characteristics.

Further in such a system when heating is carried out for the purpose of melting and kneading, violent reaction takes place between carboxylic acid radical derived from the above-mentioned modified PP and a polyamide resin, formed molded articles not only turns their color to yellowish shade greatly but also lose their lustre remarkably. As the result, a problem occurs in the point that visual appearance shows a surface state of delustered and extremely uneven in lustre and nice appearance cannot be obtained.

The inventors of the present invention made a great deal of studies in order to solve the above-mentioned problems of FR-PP. As the result, they used a specified polyamide resin obtained by the polycondensation of metaxylene and adipic acid, as a polyamide resin, mixing a modified PP or PP containing modified PP and glass fibers therewith followed by melting and kneading, and found that thus obtained polypropylene composition reinforced by glass fibers improved the mechanical strength and rigidity of molded articles and showed superior visual appearance. Thus they completed the present invention.

As evident from the foregoing description, an object of the present invention is to provide a polypropylene composition reinforced by glass fibers, from which molded articles having improved mechanical strength and rigidity and excellent visual appearance can be made.

The object of the present invention can be attained according to the compositions of the present invention having following constitutional elements.

SUMMARY OF THE INVENTION

Polypropylene compositions reinforced by glass fibers, obtained by melting and kneading a mixture of (A) 50~95 parts by weight of a polypropylene resin modified by an unsaturated carboxylic acid or an anhydride thereof or polypropylene resin containing 5 parts by weight or more of polypropylene resin modified by an unsaturated carboxylic acid or an anhydride thereof, (B) 50~5 parts by weight of a polyamide resin obtained by the polycondensation of metaxylene diamine and adipic acid, and (C) 5~100 parts by weight of glass fibers per 100 parts by weight of the total amount of the above-mentioned (A) +(B).

The polyamide resin used in the present invention, which is obtained by the polycondensation of metaxylene diamine and adipic acid is a special polyamide having a structure indicated by the following formula, containing an aromatic group ring (benzene ring) in a molecular chain and generally called nylon MXD6 (hereinafter referred to as nylon MXD6).

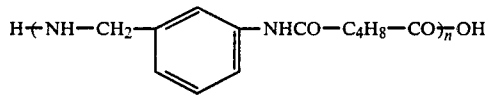

[I]

As this nylon MXD6 has a benzene ring in a molecular chain, it shows a large rigidity and has a characteristic feature of extremely higher mechanical strength and higher rigidity as compared with other polyamide resin e.g. nylon 6, nylon 66, etc. It is also a great characteristic feature for nylon MXD 6 that moisture absorption characteristics thereof is extremely small as compared with those of the above-mentioned nylon 6, nylon 66, etc.

Accordingly, in the compositions of the present invention in which nylon MXD6 is used as a polyamide resin improvements of properties which have not been experienced in the past have been contemplated by utilizing the above-mentioned characteristic properties of the nylon MXD6.

Besides the single use of the above-mentioned nylon MXD6 as a polyamide resin in the present invention the blend use of other polyamide resin e.g. nylon 6, nylon 66, nylon 11, nylon 12, nylon 610, nylon 612 together with a principal component of MXD6 is also possible.

The modified PP used in the present invention, is a material obtained by modifying PP with unsaturated carboxylic acid group. As useful unsaturated carboxylic acid group, acrylic acid, metacrylic acid, maleic acid, itaconic acid, fumaric acid, citraconic acid, maleic anhydride, citraconic anhydride, itaconic anhydride and the like can be mentioned.

As for raw material PP, useful in the modified PP, there is no special limitation, but common polypropylene homopolymer, a propylene-ethylene block copolymer, a propylene-ethylene random copolymer, a propylene-ethylene-butene copolymer, a propylene-ethylene-hexene copolymer can be used.

As a process for producing a modified PP, various kinds of conventionally known method can be used. However, a method in which any of the above-mentioned unsaturated carboxylic acid group, a common radical generator such as organic peroxide, e.g. di-t-butylperoxide, dicumylperoxide, benzoylperoxide, 2,5-dimethyl-2,5-di(t-butylperoxy)hexane, 1,3-bis(t-butylperoxyisopropyl)benzene are added to polypropylene powder and melting and kneading are carried out by using an extruder is convenient and used advantageously.

As for unmodified PP useful in the present invention there is no particular limitation as in case of raw material PP used in the production of modified PP and various kinds of PP as above-mentioned can be used. When a modified PP is used in the state of mixture with PP, mixing ratio thereof is allowable so long as it is in the range of 5% by weight or more of a modified PP. Further, wholly modified PP is also allowable. The blend ratio of nylon MXD6 and a modified PP or PP containing 5% by weight or more of modified PP (hereinafter referred to as a modified PP group), is preferably to be 5~50 parts by weight of nylon MXD6, and 95~50 parts by weight of modified PP or any of a modified PP group. Particularly, preferable, is a range of 10~40 parts by weight of nylon MXD6 and 90~60 parts by weight of modified PP or any of a modified PP group. With the range of less than 5 parts by weight of nylon MXD6, effectiveness of improvement thereof cannot be expected.

As glass fibers useful in the present invention, the use of glass fibers which are useful in the reinforcement of common resins such as glass rovings, glass chopped strands, glass milled fibers and the like is preferable.

The amount of glass fibers to be added will be preferable if it is in the range of 5~100 parts by weight per 100 parts by weight of the sum of modified PP or any of a modified PP group. More preferable ranges will be in the range of 20~90 parts by weight and most preferable range will be in the range of 30~80 parts by weight. With an amount less than 5 parts by weight, sufficient reinforcement effect cannot be attained. An amount over 100 parts by weight is not preferable because melting and kneading become extremely difficult and deterioration of melt-fluidity reduces processability.

Further in the process of the present invention, the simultaneous use of additives generally incorporated into PP, for example, antioxidants heat stabilizers, U.V. absorbers, metal salts of higher fatty acid, lubricants, coloring agents, inorganic fillers, etc. is possible.

Various processes can be adopted in the production of the present invention. By any of the following processes e.g.

(1) a process in which after mixing of a modified PP or any of a modified PP group, nylon MXD6 and glass fibers in respective definite amounts, melting and kneading are carried out, (2) a process in which after a modified PP or any of a modified PP group are melted, kneaded and pelletized, glass fibers are added and melting and kneading are carried out again, (3) a process in which by using an extruder having a raw material feeding port in the cylinder part besides a usual raw material feeding port, a modified PP or any of a modified PP group and nylon MXD6 are fed and glass fibers are fed through the feeding port situated on the cylinder part and melting and kneading are carried out, (4) a process in which melting and kneading are carried out while feeding simultaneously a modified PP or any of a modified PP group from a usual raw material feeding port, and nylon MXD and glass fibers from a feeding port situated on the cylinder.

As a mixing apparatus; a high speed mixer provided with a stirrer such as Henschel mixer (trade name), a common mixing apparatus such as ribbon blender, tumbler mixer or the like can be preferably used. For melting and kneading a common single or twin screw extruder are used. Melting and kneading temperature is in the range of 200° C.~300° C. preferably 220° C.~280° C. and most preferably 240° C.~280° C.

From the thus obtained pellets of polypropylene composition reinforced by glass fibers, test specimens of definite sizes were molded and mechanical strength, rigidity and visual appearances were measured. By using these test specimens, measurements were carried out also for mechanical strength, rigidity and visual appearance of these test specimens after treatment of forced water absorption treatment.

As the result, it has been revealed that all the compositions of the present invention show a large improvement in mechanical strength, rigidity and, visual appearance (such as degree of glossiness, hue, unevenness of gloss, surface state) as compared with those of comparative test specimens and can be used advantageously in the fields of electrical appliances, automobile parts and products to be used in various kinds of industries wherein high mechanical strength, high rigidity and good visual appearance are required.

The present invention will be more fully explained by way of specific examples and comparative examples. Further, in the present invention, mechanical strength was estimated by the measurement of tensile strength and flexural strength, rigidity was estimated by flexural modulus and visual appearance was estimated by degree of luster of surface, hue and state of unevenness of lustre. The testing carried out in specific examples and comparative example were based upon the following testing method.

Treatment of forced water absorption and measurement of water absorption

Test specimens were subjected to immersion treatment in water boiling at 100° C. for 3 days. Further from the percentage increase of weight of test specimens before and after treatment, water absorption was calculated. Observation of appearance By using flat plates having a length of 150 mm, a width of 150 mm and a thickness of 2 mm as test specimens their surface states were observed under naked eyes and estimate of hue, and unevenness of lustre were made.

Tensile strength: according to JIS K 7113
Flexural strength: according to JIS K 7203
Flexural modulus: according to JIS K 7203
Glossiness: according to ASTMD 523, degree of lustre of mirror surface of flat test specimens having a thickness of 2mm was estimated with an angle of incidence of 60°.

EXAMPLES 1~3, COMPARATIVE EXAMPLES 1~3

Ninety eight point one five parts by weight of polypropylene homopolymer having a melt flow rate (amount of extruded molten resin for 10 minutes when 2.16 Kg of load is applied at a temperature of 230° C.) of 4.5 g/10 minutes, 1.0 parts by weight of maleic anhydride, 0.1 parts by weight of 2.6-di-t-butyl-para-cresol, 0.1 parts by weight of calcium stearate, 0.05 parts by weight of 1,3-bis(t-butylperoxyisopropyl)benzene and 0.6 parts by weight of magnesium hydroxide were mixed in a Henschel mixer for 3 minutes. By using a twin screw extruder having an inner diameter of 45 mm, and several raw-material-feeding ports having L/D =30 and under a condition of 200° C., melting, kneading and extrusion were carried out to obtain a modified PP pellets having a melt flow rate of 130 g/10 min.

Then the above-mentioned modified PP and nylon MXD6 (RENY-6001, produced by Mitsubishi Gas Chemical Company, Inc.) were supplied to a tumbler mixer in respective definite amounts as described in Table 1 and mixed for 10 minutes and fed through a usual raw-material-feeding port of the above-mentioned extruder and glass fibers were fed from a feeding port situated on the cylinder part while measuring the feeding amount and pelletization was carried out while carring out melting kneading and extrusion at a temperature of 250° C.

Further as a comparative example 1, a modified PP, glass fibers were melted, kneaded and extruded to effect pelletization according to a process and a condition, the same with those of specific examples 1~3 except that nylon MXD6 was not used.

Further as a comparative example 2, according to a process and a condition, the same with those of specific examples 1~3, mixing, melting, kneading and extrusion were carried out to do pelletizing except that nylon 6 was used as a polyamide resin. Further, as a comparative example 3 according to a process, the same with those of specific examples 1~3 and at a temperature of 270° C., pelletization was carried out by melting, kneading and extrusion of the mixture at a temperature of 270° C. except that nylon 66 was used as a polyamide resin.

Thus obtained pellets were charged to an injection molding machine, definite size of test specimens were molded at a resin temperature of 250° C., a mold temperature of 80° C. and used for various kinds of tests. However, in case of pellets in which nylon 66 was used, injection molding was carried out, at a resin temperature of 275° C., and a mold temperature of 80° C. to mold definite size of test specimen which were used various kinds of tests. The results of tests are shown in Table 1.

SPECIFIC EXAMPLES 4~5, COMPARATIVE EXAMPLES 4~5

In order to investigate the effectiveness of simultaneous use of a modified PP and a usual unmodified PP, various components of a modified PP, a unmodified PP, nylon MXD 6 and glass fibers were blended according to the blending ratio of components described in Table 2, blending, melting, kneading and extrusion were carried out according to the process, the same with those of specific examples 1~3 to do pelletizing. Further, as comparative examples 4 ~5, blending, melting, kneading and extrusion were carried out according to the blending ratio of components and the process, the same with those of specific examples 1~3 to do pelletizing.

By using these pellets, test specimens of definite size were molded as in specific examples 1~3 and used for various kinds of tests.

The result obtained are shown in Table 2.

SPECIFIC EXAMPLES 6~8, COMPARATIVE EXAMPLES 6~10

In order to investigate the influence of addition amount of glass fibers, each components of a modified PP, nylon MXD6 and glass fibers were blended according to the blending ratio described in Table 3, and mixing, melting, kneading and extrusion were carried out according to a process, the same with those of specific examples 1~3 to do pelletizing.

As comparative examples 6~10, mixing, melting, kneading and extrusion were carried out according to blending ratio of components, described described in Table 3 and a process, the same with those of specific examples 1~3 to do pelletizing.

Pellets thus obtained were fed to an injection molding machine to mold test specimens of definite size as in specific examples 1~3 and used in various kinds of tests. Results obtained are shown in Table 3.

TABLE 1

| | | Specific example | | | Comparative example | | |
|---|---|---|---|---|---|---|---|
| | | 1 | 2 | 3 | 1 | 2 | 3 |
| blending ratio of component | | | | | | | |
| modified PP | parts by weight | 70 | 90 | 60 | 100 | 70 | 70 |
| non-modified PP | | 0 | 0 | 0 | 0 | 0 | 0 |
| polyamide resin | | 30 | 10 | 40 | 0 | 30 | 30 |
| kind of polyamide resin | | nylon MXD6 | nylon MXD6 | nylon MXD6 | — | nylon 6 | nylon 66 |
| glass fiber (per 100 parts of resin) part by weight | | 50 | 50 | 50 | 50 | 50 | 50 |
| strength rigidity of molded articles | | | | | | | |
| article just after molding | | | | | | | |
| tensile strength Kgf/cm$^2$ | | 1584 | 1350 | 1610 | 1025 | 1311 | 1290 |
| flexural strength Kgf/cm$^2$ | | 1901 | 1642 | 1942 | 1290 | 1638 | 1576 |

TABLE 1-continued

| | Specific example | | | Comparative example | | |
|---|---|---|---|---|---|---|
| | 1 | 2 | 3 | 1 | 2 | 3 |
| flexural modulus ($\times 10^4$ Kgf/cm$^2$) | 7.6 | 6.5 | 7.9 | 6.1 | 6.5 | 6.7 |
| article treated by forced water absorption | | | | | | |
| tensile strength (kgf/cm$^2$) | 1204 | 1053 | 1175 | 820 | 872 | 903 |
| flexural strength (Kgf/cm$^2$) | 1407 | 1248 | 1418 | 1030 | 1165 | 1122 |
| flexural modulus ($\times 10^4$ Kgf/cm$^2$) | 6.5 | 5.8 | 6.6 | 5.5 | 5.2 | 5.5 |
| water absorption (%) | 1.36 | 0.59 | 1.74 | 0.18 | 2.50 | 1.98 |
| visual appearance | | | | | | |
| glossiness (%) | 75 | 70 | 73 | 63 | 42 | 47 |
| hue | white color | yellowish white color | white | yellow | brown | brown |
| presence or absence of unevenness of lustre | no | yes some extent | no | yes some extent | yes unevenness large | yes unevenness large |

TABLE 2

| | Specific example | | Comparative example | |
|---|---|---|---|---|
| | 4 | 5 | 4 | 5 |
| blending ratio of components | | | | |
| modified PP     weight by parts | 5 | 35 | 2 | 97 |
| unmodified PP | 65 | 35 | 68 | 0 |
| polyamide resin | 30 | 30 | 30 | 3 |
| detail of polyamide resin | nylon MXD 6 | nylon MXD 6 | nylon MXD 6 | nylon MXD 6 |
| glass fibers parts by weight (per 100 parts of resin) | 50 | 50 | 50 | 50 |
| strength, rigidity of molded articles | | | | |
| article just after molding | | | | |
| tensile strength (Kgf/cm$^2$) | 1156 | 1498 | 890 | 1026 |
| flexural strength (Kgf/cm$^2$) | 1387 | 1787 | 1068 | 1288 |
| flexural modulus ($\times 10^4$ Kgf/cm$^2$) | 7.8 | 7.6 | 6.9 | 6.1 |
| article treated by forced water absorption | | | | |
| tensile strength (Kgf/cm$^2$) | 902 | 1138 | 712 | 811 |
| flexural strength (Kgf/cm$^2$) | 1054 | 1331 | 908 | 1035 |
| flexural modulus ($\times 10^4$ Kgf/cm$^2$) | 6.7 | 6.5 | 6.0 | 5.4 |
| water absorption (%) | 1.35 | 1.34 | 1.14 | 0.23 |
| visual appearance | | | | |
| glossiness (%) | 78 | 75 | 80 | 65 |
| hue | white color | white color | white color | yellow color |
| presence or absence of unevenness of gloss | no | no | no | somewhat yes |

TABLE 3

| | Specific example | | | Comparative example | | | | |
|---|---|---|---|---|---|---|---|---|
| | 6 | 7 | 8 | 6 | 7 | 8 | 9 | 10 |
| blending ratio of component | | | | | | | | |
| modified PP   parts by weight | 70 | 70 | 70 | 100 | 100 | 100 | 70 | 70 |
| unmodified PP | 0 | 0 | 0 | 0 | 0 | 0 | 0 | 0 |
| polyamide resin | 30 | 30 | 30 | 0 | 0 | 0 | 30 | 30 |
| detail of polyamide resin | nylon MXD6 | nylon MXD6 | nylon MXD6 | — | — | — | nylon 6 | nylon 6 |
| glass fiber parts by weight (per 100 parts of resin) | 10 | 25 | 100 | 10 | 25 | 100 | 25 | 100 |
| strength rigidity of molded articles | | | | | | | | |
| article just after molding | | | | | | | | |
| tensile strength Kgf/cm$^2$ | 911 | 1283 | 1762 | 610 | 830 | 1197 | 1030 | 1522 |
| flexural strength Kgf/cm$^2$ | 1093 | 1558 | 2211 | 730 | 1010 | 1615 | 1230 | 1894 |
| flexural modulus ($\times 10^4$ Kgf/cm$^2$) | 3.4 | 5.1 | 11.9 | 2.3 | 4.0 | 9.4 | 4.5 | 9.7 |
| article treated by forced water absorption | | | | | | | | |
| tensile strength (Kgf/cm$^2$) | 656 | 949 | 1410 | 518 | 656 | 970 | 669 | 1043 |
| flexural strength (Kgf/cm$^2$) | 765 | 1122 | 1747 | 606 | 777 | 1244 | 763 | 1260 |
| flexural modulus ($\times 10^4$ Kgf/cm$^2$) | 2.8 | 4.3 | 10.3 | 2.1 | 3.6 | 8.5 | 3.6 | 8.0 |
| water absorption (%) | 1.78 | 1.59 | 1.07 | 0.08 | 0.14 | 0.17 | 3.01 | 2.03 |
| appearance | | | | | | | | |

TABLE 3-continued

|  | Specific example | | | Comparative example | | | | |
| --- | --- | --- | --- | --- | --- | --- | --- | --- |
|  | 6 | 7 | 8 | 6 | 7 | 8 | 9 | 10 |
| glossiness (%) | 86 | 81 | 67 | 74 | 70 | 45 | 49 | 33 |
| hue | white color | white color | white color | yellow color | yellow color | yellow color | brown color | brown color |
| presence or absence of unevenness of gloss | non | non | somewhat presence | non | somewhat presence | presence unevenness great | presence unevenness great | presence unevenness great |

As seen from Table 1 it may be natural that specific examples 1~3 provide products superior in mechanical strength (such as tensile strength, flexural strength) and rigidity (flexural modulus) to those of products of comparative example 1 in which polyamide resin is not used but it would be unexpectable that visual appearance has been revealed to be equal to those in which polyamide is not used in spite of the use of polyamide and the superiority of visual appearance of products of the compositions of the present invention has been confirmed. Further when specific examples 1~3 are compared with comparative examples 2~3 in which nylon 6, and nylon 66 are used as polyamide resin, it has been confirmed that all of the mechanical strength, rigidity and visual appearance are superior in both the cases, before and after water absorption treatment.

Further it is astonishing that the superiority of composition of the present invention has been confirmed by specific example 2. Namely, in spite of the use of smaller amount of nylon MXD 6 as low as 10 parts by weight, specific example 2 shows mechanical strength and rigidity superior to those of comparative examples 2~3 in which nylon 6 and nylon 66 are used.

It has been revealed that the composition of the present invention is extremely smaller in water absorption property than the compositions in which nylon 6 and nylon 66 are used.

In addition, it has been also revealed that the reduction of mechanical strength, and rigidity after treatment of forced water absorption is smaller than the compositions in which nylon 6 and nylon 66 are used.

As seen from Table 2, when the amount of a modified PP to be mixed with unmodified PP is 5 parts by weight or more, it has been revealed that there is no problem in the compatibility of nylon MXD 6 and unmodified PP and satisfactory mechanical strength, rigidity and visual appearance can be obtained.

In comparative example 4, since the amount of modified PP used is smaller, compatibility of unmodified PP with nylon MXD 6 is reduced and the effect of addition of nylon MXD 6 is not revealed. In comparative example 5, since the amount of nylon MXD 6 to be added is as smaller as 3 parts by weight, the effect of improvement is not revealed at all.

As seen from Table 3, if the amount of addition of glass fibers is increased, mechanical strength and rigidity naturally increase but reduction of visual appearance is accompanied, but specific examples 6~8, show better visual appearance than corresponding comparative examples 6~8. It has been also revealed that mechanical property and rigidity also show great improvement over those of comparative examples 9~10 in which nylon 6 is used.

Thus it has been confirmed that the composition of the present invention show a great improvement in mechanical strength, rigidity and visual appearance and has smaller property of water absorption.

What is claimed is:

1. Polypropylene compositions reinforced by glass fibers, obtained by melting and kneading a mixture of
 (A) 60~95 parts by weight of a polypropylene resin modified by an unsaturated carboxylic acid or an anhydride thereof or polypropylene resin containig 5 parts by weight or more of polypropylene resin modified by an unsaturated carboxylic acid or an anhydride thereof
 (B) 50~5 parts by weight of a polyamide resin obtained by the polycondensation of metaxylene diamine and adipic acid and
 (C) 5~100 parts by weight of glass fibers per 100 parts by weight of the total amount of the above-mentioned (A) and (B) constituents.

2. Polypropylene compositions reinforced by glass fibers, according to claim 1 in which (A) 70 parts by weight of polypropylene resin modified by an unsaturated carboxylic acid or anhydride thereof (B) 30 parts by weight of polyamide resin obtained by the polycondensation of metaxylene diamine and adipic acid and (C) 50 parts by weight of glass fibers based upon 100 parts by weights of the sum of said (A) and said (B) constituents, are melted and kneaded.

3. Polypropylene compositions reinforced by glass fibers, according to claim 1 in which (A) 80 parts by weight of polypropylene resin modified by an unsaturated carboxylic acid or anhydride thereof (B) 20 parts by weight of polyamide resin obtained by the polycondensation of metaxylene diamine and adipic acid and (C) 55 parts by weight of glass fibers based upon 100 parts by weights of the sum of said (A) and said (B) constituents, are melted and kneaded.

4. Polypropylene compositions reinforced by glass fibers according to claim 1 in which said unsaturated carboxylic acid or anhydride thereof is at least one member selected from the group consisting of acrylic acid, metacrylic acid, maleic acid, itaconic acid, fumaric acid, citraconic acid, maleic anhydride, citraconic anhydride, itaconic anhydride.

5. Polypropylene compositions reinforced by glass fibers according to claim 1 in which said polypropylene resin is at least one member selected from the group consisting of polypropylene homopolymer, a propylene-ethylene block copolymer, a propylene-ethylene random copolymer, a propylene-ethylene-butene copolymer and a propylene-ethylene-hexene copolymer.

6. Polypropylene compositions reinforced by glass fibers according to claim 2 in which said unsaturated carboxylic acid or anhydride thereof is at least one member selected from the group consisting of acrylic acid, metacrylic acid, maleic acid, itaconic acid, fumaric acid, citraconic acid, maleic anhydride, citraconic anhydride, itaconic anhydride.

7. Polypropylene compositions reinforced by glass fibers according to claim 3 in which said unsaturated carboxylic acid or anhydride thereof is at least one member selected from the group consisting of acrylic acid, metacrylic acid, maleic acid, itaconic acid, fumaric acid, citraconic acid, maleic anhydride, citraconic anhydride, itaconic anhydride.

8. Polypropylene compositions reinforced by glass fibers according to claim 2 in which said polypropylene resin is at least one member selected from the group consisting of polypropylene homopolymer, a propylene-ethylene block copolymer, a propylene-ethylene random copolymer, a propylene-ethylene-butene copolymer and a propylene-ethylene-hexene copolymer.

9. Polypropylene compositions reinforced by glass fibers according to claim 3 in which said polypropylene resin is at least one member selected from the group consisting of polypropylene homopolymer, a propylene-ethylene block copolymer, a propylene-ethylene random copolymer, a propylene-ethylene-butene copolymer and a propylene-ethylene-hexene copolymer.

* * * * *